United States Patent [19]

Hartman

[11] Patent Number: 5,030,514
[45] Date of Patent: Jul. 9, 1991

[54] PAINT COMPOSITES

[75] Inventor: Marvis E. Hartman, Pittsburgh, Pa.

[73] Assignee: PPG Industries, Inc., Pittsburgh, Pa.

[21] Appl. No.: 344,173

[22] Filed: Apr. 27, 1989

[51] Int. Cl.⁵ .............................................. B32B 5/16
[52] U.S. Cl. ................................ 428/363; 428/423.1;
428/423.3; 428/423.7; 428/425.1; 428/425.9
[58] Field of Search ............... 428/423.1, 423.3, 425.1,
428/363, 425.9, 423.7

[56] References Cited

U.S. PATENT DOCUMENTS

| | | | |
|---|---|---|---|
| 2,761,791 | 9/1956 | Russell | 117/34 |
| 3,916,046 | 10/1975 | Youngberg | 428/31 |
| 3,935,353 | 1/1976 | Doerfling | 428/99 |
| 3,954,899 | 5/1976 | Chang | 260/849 |
| 3,959,201 | 5/1976 | Chang | 260/29.4 |
| 4,115,619 | 9/1978 | Kurfman et al. | 428/336 |
| 4,147,679 | 4/1979 | Schriven et al. | 260/26 |
| 4,211,809 | 7/1980 | Barta | 428/201 |
| 4,423,179 | 12/1983 | Guagliardo | 524/529 |
| 4,485,228 | 11/1984 | Chang et al. | 528/84 |
| 4,496,628 | 1/1985 | Deatcher et al. | 428/337 |
| 4,550,052 | 10/1985 | Malek | 428/323 |
| 4,582,876 | 4/1986 | Weemes | 525/64 DD |
| 4,678,690 | 7/1987 | Palmer et al. | 428/31 |
| 4,719,132 | 1/1988 | Porter Jr. | 427/409 |
| 4,810,540 | 3/1989 | Ellison et al. | 428/31 |

FOREIGN PATENT DOCUMENTS

| | | |
|---|---|---|
| 230364A | 7/1987 | European Pat. Off. |
| 251546A | 1/1988 | European Pat. Off. |
| 261815A | 3/1988 | European Pat. Off. |
| 285071A | 5/1988 | European Pat. Off. |
| 1202330 | 8/1970 | United Kingdom |
| 79/00103 | 3/1979 | World Int. Prop. O. |

*Primary Examiner*—Edith Buffalow
*Attorney, Agent, or Firm*—Daniel J. Long

[57] ABSTRACT

A paint composite article comprising a thermally deformable carrier film having an adhesive layer on one surface. A paint layer is positioned on the opposed side of the carrier film and a tiecoat is interposed between the carrier film and the paint layer to promote adhesion of the paint layer. The tiecoat is preferably a mixture of an acrylic polymer and polyurethane. The paint layer includes a pigmented basecoat layer adhered to the thermally deformable carrier film through the tiecoat layer and a transparent topcoat layer superimposed over the basecoat layer. The tiecoat may also include an aminoplast and an alkylbenzene.

20 Claims, 1 Drawing Sheet

PAINT COMPOSITES

FIELD OF THE INVENTION

This invention relates to paint composites which may be used to apply a coating to a substrate, e.g., to the surface of a component such as the exterior surface of an automobile body panel.

BACKGROUND OF THE INVENTION

Automotive body panels are traditionally made of sheet metal or plastic material painted with layers of pigmented paints. The painting procedure for these panels requires elaborate facilities, and consequently involves heavy expenses. For instance, a large area of floor space must be maintained in a clean room environment for the spraying of paint and for the baking and curing of such paint on the body panels. The paint may include both a pigmented basecoat and transparent clear coat. Moreover, solvent-based paints have come to be considered undesirable in recent years due to environmental concerns. As a consequence, the evaporation of such solvents must be strictly controlled.

The present invention is concerned with a method of making paint composites for the painting of automobile body panels which may permit elimination of the entire painting procedure presently utilized in automobile assembly plants.

A variety of paint composites often referred to as laminates have previously been described. Typically, such composites or laminates have included a paint layer, an adhesive layer adjacent to the paint layer and a carrier film adjacent to the paint layer. The composite is applied to a substrate with the adhesive against the substrate's surface and the carrier layer on the exterior of the composite. Subsequently, the carrier layer may be generally removed or may remain as a protective layer. Patents utilizing such laminate arrangements include European Patent Application 230,364 and U.S. Pat. Nos. 3,640,791; 4,101,698; 4,275,099; 4,330,352; and 4,451,522.

SUMMARY OF THE INVENTION

The present invention relates to a paint composite article. The article comprises:
(a) a thermally deformable carrier film having first and second major surfaces,
(b) an adhesive superimposed on the first surface of the thermally deformable carrier film,
(c) an adhesion promoting tiecoat layer superimposed on the second surface of the carrier film,
(d) a paint layer superimposed on said tiecoat layer.

The paint layer comprises (i) a pigmented basecoat adhered to the thermally deformable carrier film through said tiecoat layer; and (ii) a transparent topcoat layer superimposed on the basecoat layer.

The above-described paint composite can be applied to automobile body panels. By the use of the present invention, prepainted carrier films can be applied to vehicle body panels such that all the body panels mounted on an automobile will have the desired decorative effect.

BRIEF DESCRIPTION OF THE DRAWINGS

The present invention is further described with reference to the accompanying drawings in which.

DETAILED DESCRIPTION

Figure 1:
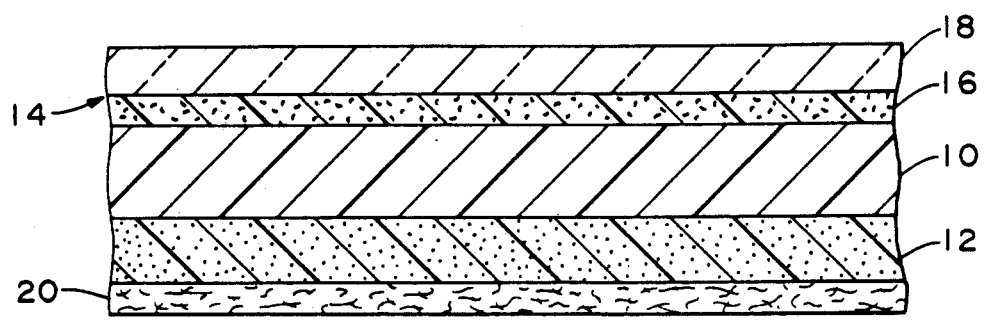
FIGS. 1–4 are various vertical cross sectional views, in fragment, showing various embodiments of paint composite articles described herein.

Referring to FIG. 1, the paint composite article includes a carrier film 10. On one surface of the carrier film, there is an adhesive layer 12. Superimposed on the other surface of the carrier film there is a paint layer shown generally at numeral 14. The paint layer is made up of a pigmented layer 16 and a clear coat layer 18. A temporary support film 20 may also be positioned beneath the adhesive layer.

Carrier film 10 can typically be a polymeric film, such as polyurethane, a polyester, e.g., polyethylene terephthalate, or a blend of such polymeric materials. The carrier film should preferably have a low enough Tg to allow for its deformation at application temperature and a high enough Tg to allow for using paint materials in the composite. Further, carrier film 10 should have a high tensile strength and elongation to allow for stretching around corners and edges of a substrate such as an automobile body part. Typically, the carrier film will have a thickness of 5 to 10 mils. A suitable carrier film is that available from Eastman Kodak Company as PMB 10231.

The prepainted carrier film is generally applied and adhered to an automobile body part by a vacuum forming procedure involving the use of heat to render the film sufficiently pliable for application. One preferred means of carrying out this procedure is described in European Patent Application No. 251,561, filed June 16, 1987 and published July 1, 1988.

The adhesive material which is optionally applied to the surface of thermally deformed carrier film 10 opposite the paint layer can generally be an adhesive such as a pressure-sensitive adhesive or a heat-activated adhesive. The adhesive may be either solvent or waterborne, preferably waterborne. The adhesive should provide good bond strength to the coated article under a variety of environmental conditions. Adhesive layer 12 is generally from about 1 to 6 mils, preferably from about 2 to 4 mils thick upon carrier film 10.

Preferred adhesive compositions for adhering the carrier film to the automobile part are based on arylic latex polymers prepared predominantly from aliphatic acrylate monomers having pendant carbon chain lengths of from 3 to 5 carbon atoms with minor amounts of a hydroxyalkyl acrylate monomer and acrylic acid. One particularly prefered latex is prepared at about 55 percent solids in water from about 59 percent of isobutyl acrylate, 31 percent butyl acrylate, 7 percent methyl methacrylate and 1 percent each of styrene, hydroxypropyl acrylate and acrylic acid. The composition also contains a defoamer, fungicide, and a polyacrylate thickener. Other conventional additives and fillers can be utilized if desired.

The adhesive composition can be applied to the bottom surface of the carrier film by such conventional techniques as spray or roll coating. The adhesive composition may be activated by the heat applied during the vacuum forming of the part.

The pigmented basecoat layer 16 portion of the paint layer 14 can be formed from solvent or aqueous-based film-forming compositions which generally include as an essential ingredient a thermoplastic polyurethane binder. Such a polyurethane can be prepared by reacting an organic polyisocyanate with an active hydrogen-containing material such as a polyol and/or a polyamine to form a polyurethane, polyurea or mixed poly(urethane-urea). In the present invention where the term "polyurethane" is used, not only polyurethanes from the reaction of polyisocyanates and polyols are intended, but also mixed poly(urethane ureas) and polyureas are intended. Also, reaction products obtained from the reaction of polyisothiocyanates with active hydrogen-containing compounds are intended.

To achieve the best blend of properties in basecoat layer 16, e.g., flexibility, elongation, and adhesiveness, the organic polyisocyanate is reacted with the polymeric active hydrogen-containing compound and preferably with a short chain active hydrogen-containing compound.

The organic polyisocyanate which is used can be an aliphatic including cycloaliphatic or aromatic polyisocyanate or a mixture of the two. Diisocyanates are preferred although higher polyisocyanates can be used in place of or in combination with diisocyanates. Examples of suitable polyisocyanates are 4,4'-diphenylmethane diisocyanate, toluene diisocyanate, 1,6-hexamethylene diisocyanate, isophorone diisocyanate, 4,4'-methylene-bis(cyclohexylisocyanate), trimethylhexamethylene diisocyanate and 1,2,4-benzene triisocyanate. Isothiocyanates corresponding to the above-described isocyanates (where they exist) can be employed as well as mixed compounds containing both isocyanate and isothiocyanate groups.

The preferred active hydrogen-containing materials which are reacted with the polyisocyanates include materials such as amines, amino alcohols, mercapto-terminated derivatives and polyols, which are preferred. The term "active hydrogen" refers to hydrogens which, because of their position in the molecule, display reactivity according to the Zerewitinoff test. Preferred active hydrogens include hydrogen atoms attached to oxygen, nitrogen or sulfur and thus useful compounds having at least two of the groups from the group of hydroxyl, thiol, and primary or secondary amines.

For the development of the best blend of properties such as good flexibility, elongation and adhesiveness, the active hydrogen-containing materials are preferably a mixture of both high molecular weight active hydrogen-containing materials, e.g., polymeric active hydrogen-containing compounds, and low molecular weight active hydrogen-containing materials, e.g., short chain active hydrogen-containing compounds. Examples of suitable low molecular weight active hydrogen-containing materials are diols, triols, diamines and triamines having a molecular weight less than 300 and usually in the range of about 60 to 250. Such materials include aliphatic polyols, particularly alkylene polyols containing from about 2 to 18 carbon atoms such as ethylene glycol, 1,4-butanediol, neopentyl glycol, 1,6-hexanediol and trimethylolpropane. Polyols including acid groups such as dimethylolpropanoic acid can also be used as can polyamines such as ethylene diamine and hydrazine. Mixtures of such low molecular weight active hydrogen-containing materials may also be used.

Examples of high molecular weight active hydrogen-containing materials are polymeric polyols which have molecular weights of at least 400 and usually within the range of about 400 to 3000. The most suitable polymeric polyols include polyether polyols such as linear polyether diols, polyester polyols, including polyhydroxy polyesteramides, and hydroxyl-containing polycaprolactones and hydroxyl-containing acrylic interpolymers including mixtures of polymeric polyols. Polyester polyols such as linear polyester diols including hydroxy-containing polycaprolactones, particularly diols, are preferred.

Examples of polyether polyols are polyalkylene ether polyols which have the following structural formula:

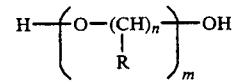

where the substituted R is hydrogen, a lower alkyl, or mixtures thereof, n is typically from 2 to 6, and m is from 2 to 100 or higher. Examples are poly(oxytetramethylene) glycols and poly(oxyethylene) glycols.

Examples of polyester polyols are those prepared by polyesterification of organic polycarboxylic acids or anhydrides thereof with organic polyols. Polyols used in preparing the polyester include alkylene glycols, such as ethylene glycol, 1,4-butanediol, neopentyl glycol, trimethylolpropane and the like including mixtures thereof.

The acid component of the polyester can be monomeric carboxylic acids or anhydrides having about 2 to 36 carbon atoms per molecule. The acid may be acyclic or cyclic including cycloaliphatic or aromatic polycarboxylic acids. Among the acids which can be used are phthalic acid, tetrahydrophthalic acid, hexahydrophthalic acid, adipic acid, dimeryl diacid and maleic acid including mixtures of such acids. Where acids are referred to above, it is understood that anhydrides of those acids which form anhydrides can be used in place of the acid. Also, lower alkyl esters of diacids, such as dimethyl esters, can be used. The preferred acid mixture employed in forming the polyester contains a $C_{36}$ dicarboxylic acid product known as dimer acid. The processes for forming this acid are well known and form the subject of numerous U.S. Pat. Nos. including, for example, 2,482,761, 2,793,220, 2,793,221, and 2,955,121. In carrying out such dimer-forming procedures, unsaturated fatty acids such as oleic, linoleic and linolenic acid, or mixtures of such acids (all of essentially $C_{18}$ chain length) are heated in the presence of water, or in the presence of both water and an active clay mineral, to induce polymerization.

Preferably, the relative amounts of organic polyisocyanate and active hydrogen-containing compounds which are reacted with one another are such that the resulting polymer will have a urethane content greater than 6, preferably at least 8, more preferably about 8 to 25 percent by weight. The percentage by weight is based upon the weight of urethane linkage per total weight of polymer. By "urethane", it is meant to include not only the reaction of isocyanate and hydroxy, i.e., —N(H)—C(O)—O— but also to include the reaction of isocyanate and other active hydrogens such as primary and secondary amino and thiol.

With regard to the active hydrogen-containing materials which were used in preparing the polyurethane, the high molecular weight active hydrogen-containing material is preferably present in amounts of about 50 to 95, more preferably 60 to 85 percent by weight based on the total weight of an active hydrogen-containing material with the remainder being the low molecular weight active hydrogen-containing material.

The organic polyisocyanate and active hydrogen-containing materials can be reacted at temperatures of from about 20° C. to 200° C. for about 0.1 to 4 hours and optionally in the presence of a catalyst such as an organo tin compound. The reactants and solvents used in the reaction preferably are dry. Polyurethanes can be prepared via so-called "one shot" techniques in which all of the active hydrogen-containing materials are reacted with the organic polyisocyanate, or preferably by the prepolymer method in which only part of the active hydrogen containing materials are reacted to form an isocyanate prepolymer followed by reacting the prepolymer with the remaining portion of active hydrogen-containing materials.

The polyurethanes for use in the practice of the present invention may be either water dilutable or solvent dilutable, i.e., they can be either aqueous polyurethane dispersions which are preferred or solvent solutions of polyurethanes.

Dispersion can be obtained by thinning the polyurethanes in a water-miscible solvent and dispersing the diluted polyurethanes with water, optionally in the presence of an externally added surfactant. Preferably, however, the polyurethanes are prepared so that they contain ionic salt groups in the polymer backbone. Such ionically charged polymers can be dispersed more readily in water and form more stable dispersions. Examples of ionic groups are anionic salt groups selected from the class consisting of $-OSO_3-$, $-COO-$, $-OPO_3=$, $-SO_2O-$, $-POO-$ and $PO_3=$, with $COO-$ being preferred. The polyurethane can be prepared with reactants containing an acid group which can be subsequently neutralized before, after or during polyurethane formation. A portion of the acid groups can be iminated such as by reacting with hydroxyethyl ethyleneimine. Suitable materials for introducing acid groups into the polyurethane are compounds which have two groups which are reactive towards isocyanate groups and at least one group which is capable of forming an anion. Examples of such compounds are hydroxy and mercapto carboxylic acids. Specific examples include dimethylolpropionic acid, which is preferred, glycolic acid and lactic acid. Other examples of compounds which contain active hydrogens and acid groups are amino carboxylic acids, amino hydroxy carboxylic acids, sulfonic acids, hydroxy sulfonic acids and amino sulfonic acids. Examples include oxaluric acid, anilido acetic acid, glycine, 6-amino-caprylic acid, reaction product of ethanolamine and acrylic acid, hydroxyethylpropionic acid, 2-hydroxy-ethane sulfonic acid and sulphanilic acid. Amino acids must be used in the presence of base such as potassium hydroxide or a tertiary amine. Other examples include bis-hydroxymethyl-phosphinic acid, trimethylolpropane monophosphate and monosulfate. Suitable salt-forming agents for acid group-containing compounds include inorganic and organic bases such as sodium hydroxide, potassium hydroxide, ammonia and tertiary amines.

Besides anionic salt groups which are preferred, the polyurethane can contain cationic salt groups such as those selected from the class consisting of:

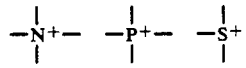

including mixed groups.

Preparation of polyurethanes with cationic groups are described in U.S. Pat. No. 4,147,679, column 12, line 12, to column 13, line 30, the portions of which are herein incorporated by reference.

Besides using ionic solubilizing groups as described above, nonionic solubilizing groups can be incorporated into the polymer. The nonionic water-solubilizing groups can be incorporated into the polymer through the isocyanate or through the active hydrogen component of the polyurethane. Examples of nonionic water-solubilizing groups are ethylene oxide moieties which should constitute not more than 50 percent by weight of the prepolymer and which can be incorporated into the prepolymer using polyethylene glycols.

The polyurethanes can be prepared as described above and dispersed directly in water. Examples of preparing the polyurethanes by this technique are shown in U.S. Pat. No. 3,479,310 to Dieterich et al. Also, water-based polyurethanes can be prepared in accordance with Examples 6 and 7 of U.S. Pat. No. 3,954,899.

High molecular weight thermoplastic polyurethanes are preferred in the basecoat compositions because they provide for optimum metallic pigment orientation and prevent strike-in of the topcoat without the need for special additives. Also, high molecular weight polyurethanes provide for optimum adhesiveness, elongation, and flexibility in basecoat layer 16 making the basecoat useful for stretch forming of the paint composite over and around automotive parts. Preferably, basecoat layer 16 based upon the polyurethane will have a tensile strength of greater than 2000 and usually within the range of 2500 to 10,000 psi and elongations of at least 100 and more preferably from 150 to 250 as determined accordingly to ASTM D-639-72.

Basecoat layer 16 further contains color pigments and metallic pigments. Compositions including metallic flake pigmentation provides for the production of so-called "glamour metallic" finishes upon the surface of, e.g., automobiles. Proper orientation of the metallic pigments results in a lustrous shiny appearance with excellent flop, distinctness of image (DOI), and high gloss. By "flop" is meant the visual change in brightness or lightness of a metallic coating with a change in viewing angle, i.e., a change from 180° to 90°. The greater the change, i.e., from a light to dark appearance, the better the flop. Flop is important because it accentuates the lines of a curved surface such as an automobile body. Suitable metallic pigments include, in particular, aluminum flake, copper bronze flake and metal oxide coated mica.

Besides the metallic pigments, basecoat layer 16 may include nonmetallic colored pigments conventionally used in surface coating compositions including inorganic pigments such as titanium dioxide, iron oxide, chromium oxide, lead chromate, carbon black and the like and organic pigments such as phthalocyanine blue and phthalocyanine green.

In general, pigment is incorporated into basecoat layer 16 composition in amounts of about 1 to 80 percent by weight based on weight of coating solids. Metallic pigmentation is employed in amounts from about 0.5 to 35 percent by weight of the aforesaid aggregate weight. If desired, the composition for forming basecoat layer 16 may additionally contain other materials well known in the art of formulating surface coatings such as surfactants, flow control agents, thixotropic agents, fillers, anti-gassing agents, organic co-solvents, catalysts and other similar auxiliary additives.

The metallic-pigmented basecoat composition is applied to a surface of carrier film 10 in a manner which provides a shearing force upon the metallic-pigmented basecoat composition. The shearing force should be sufficient to provide for metallic orientation within resultant metallic-pigmented basecoat layer 16. Various means of applying a sufficient shearing force are available and include roll coating, i.e., coating with a knife over roll, or coating with an air knife over the roll coating to provide sufficient shear.

During application of the basecoat composition, a film of the basecoat is formed on the carrier film. Typically, the thickness of basecoat layer 16 will be from about 0.1 to 3 mils. After application of the basecoat composition to carrier film 10, a basecoat layer film is formed by driving water or solvent out of the applied basecoat composition. This can be accomplished by heating or simply by air drying. Preferably, the heating step will only be for a short period of time sufficient to ensure that a subsequently applied transparent topcoat composition can be applied to basecoat layer 16 without any tendency of the former to mix or dissolve the basecoat layer, i.e., "striking in". Suitable drying conditions will depend on the ambient humidity and temperature but, in general, a drying time of from 1 to 60 minutes at a temperature of 160° to 200° Fahrenheit (F) (71° C. to 93° C.) will be adequate to ensure that mixing of the two coating layers is prevented. The temperature of drying should not degrade or deform the carrier film 10. At the same time, basecoat layer 16 is adequately wetted by the transparent topcoat composition so that satisfactory intercoat adhesion is obtained. Also, more than one basecoat layer and multiple clearcoat layers may be applied to develop the optimum appearance. Usually, between coats, the previously applied basecoat layer or topcoat layer is baked, i.e., exposed to ambient conditions, for from about 1 to 60 minutes to form a dry/cured film.

The transparent topcoat layer 18 can include a film-forming polymer and usually a diluent. Any suitable film-forming polymer may be used. The polymer may be either thermoplastic or thermosetting in nature. The polymer may be, e.g., an acrylic polymer which is particularly useful for automotive finishes. Such acrylic polymers are polymers or copolymers of one or more alkyl esters of acrylic acid or methacrylic acid, optionally together with other ethylenically unsaturated monomers. Suitable acrylic esters include methyl methacrylate, butyl methacrylate, 2-ethylhexyl acrylate and the like. Suitable other copolymerizable monomers include, e.g., styrene and acrylonitrile. Where the acrylic polymer is of the thermosetting type, there should be suitable functional monomers present to result in crosslinking. Examples would include hydroxyl-containing acrylic monomers such as hydroxyethyl methacrylate, hydroxypropyl methacrylate or the like and acid-containing acrylic monomers such as acrylic acid or methacrylic acid. These materials can be crosslinked with a curing agent such as an aminoplast condensate or a polyisocyanate. Suitable aminoplasts include those previously described below.

Polyisocyanates and blocked isocyanates can also be used as curing agents. Examples of suitable polyisocyanates include monomeric polyisocyanates such as toluene diisocyanate, 4,4'-methylene-bis(cyclohexyl isocyanate), isophorone diisocyanate and isocyanate-prepolymers such as the reaction products of monomeric polyisocyanate, such as those previously mentioned above, with polyester polyols or polyether polyols.

Besides the acrylic polymers, polyesters can also be used in the formulation of the transparent topcoat. Usually, these polyesters or polyester polyols are designed to be cured with a polyisocyanate or with an aminoplast resin. Polyesters can be formed by the polyesterification of an organic polycarboxylic acid or its functional equivalent thereof, e.g., an anhydride thereof, with an organic polyol. Among the acids which can be used are phthalic acid, terephthalic acid, tetrahydrophthalic acid, hexahydrophthalic acid, azelaic acid and dimerized fatty acids including mixtures thereof. Example of suitable polyols are ethylene glycol, 1,4-butanediol, neopentyl glycol, trimethylpentanediol, trimethylolpropane and the like, including mixtures thereof.

Polyurethanes may also be used as the film-forming polymer in the clearcoat layer 18. Particularly suitable are poly(ester-urethane) polyols which can be cured with an aminoplast or polyisocyanate as described above. The polyester polyol is usually first prepared and then reacted with the polyisocyanate. Polyesters which may be used include those previously mentioned above. The polyisocyanate can be aromatic, aliphatic, and cycloaliphatic with aliphatic and cycloaliphatic being preferred because of better U.V. light stability. Examples of polyisocyanates are described above. The polyurethane-based topcoating compositions are preferred. Examples of such polyurethane-based coating compositions are described in U.S. Pat. Nos. 4,485,228 and 4,540,766, both to Chang et al, which are hereby incorporated by reference.

Topcoat compositions can be applied over basecoat layer 16 by any conventional technique such as brushing, spraying, dipping, rolling or flowing, but it may be preferred that a roll-coat application be used where a roll-coat application is used to apply the basecoat composition.

After application of the topcoat composition to basecoat layer 16, the coated carrier film may be subjected to heating to conjointly harden the coating layers. In the curing operation, solvents and/or water are driven off and the film-forming material of topcoat layer 18 can be crosslinked with the aid of any crosslinking agents present. The heating or curing operation is carried out at a temperature which is not detrimental to carrier film 10, generally in the range of from about 160° F. to 200° F. (71° C. to 93° C.). Lower or higher temperatures may be used so long as the temperature does not degrade carrier film 10. The thickness of topcoat layer 18 is generally from about 1 to 12 mils, preferably about 1.2 to 10 mils.

To provide for application of the composite paint article of this invention, basecoat layer 16 and topcoat layer 18 must each be flexible and provide for elongation. The flexibility of the coatings can be determined by coating an elastomeric substrate such as a ⅛" thick thermoplastic polyester urethane commercially available from Mobay Company as TEXIN 3202 and bending the coated substrate around the ¼" diameter mandrel with the coating side outwardly facing. After bending, the coating is examined for breaks or cracks. Testing can be conducted at room temperature, i.e., 70° F. to 75° F. or at low temperature, i.e., a cooled substrate at 0° F. before bending. The present coatings preferably exhibit no breaks or cracks when tested at 32° F. in the above-described manner and more preferably exhibit no breaks or cracks at 0° F.

The elongation of the present coatings can be determined by Instrom testing.

The hardness of the coatings can be determined by the Sward method using a Sward rocker as described in ORGANIC COATINGS TECHNOLOGY, Payne, Volume I, 1965, pages 642-643. Cured coatings of the present paint composite preferably have a Sward hardness within the range of 10 to 40, more preferably 10 to 24. Testing for Sward hardness is done on coatings having a thickness of about 2 to 3 mils over steel panels.

Temporary protective cover 20 can be situated adjacent adhesive layer 12 to enable the paint composite article to be stored and rolled without adhesive layer 12 coming in contact with transparent coating layer 17. Temporary protective cover 20 should be easily removable from the adhesive. For example, the temporary protective cover can be a paper or a polymeric material such as MYLAR available from E. I. du Pont de Nemours and Co., Inc.

The paint composite article can be applied to automobile body parts in a fashion similar to that described in European Patent Application 251,546. Generally, temporary protective cover 20 is removed from the paint composite article; adhesive layer 12 of the paint composite article is positioned over the substrate to be coated; and the paint composite article may be heated to activate the adhesive and to thermally deform carrier film 10 whereby a vacuum can shape the paint composite article over the substrate to provide a painted automobile body part.

Figure 2:
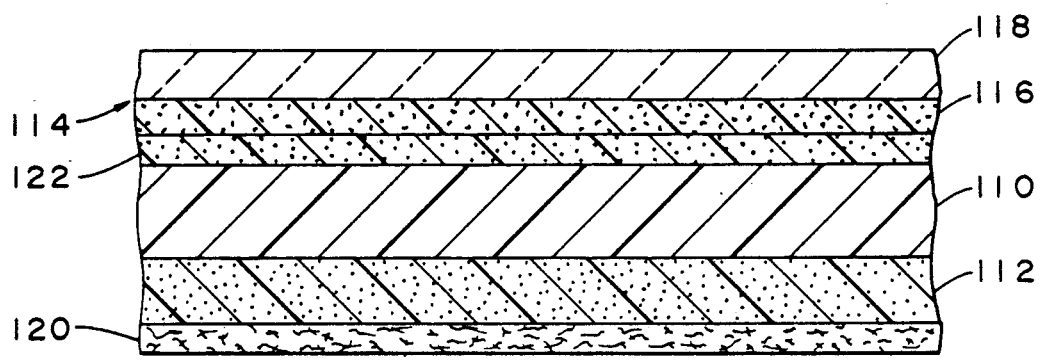

Referring to FIG. 2, the composite is similar to that of FIG. 1 in that it also includes a carrier film 110 with an adhesive layer 112 on one side and a paint layer 114 on its other side. The paint layer 114 similarly includes a pigmented basecoat layer 116 and a transparent topcoat layer 118. This composite may also include a temporary protective cover 120. The above-described components have the same characteristics as those described above in connection with the corresponding components described above in connection with FIG. 1. The paint composite of FIG. 2 additionally, however, includes a tiecoat layer 122 between the carrier film 110 and the paint layer 114. This tiecoat layer may consist of any suitable adhesion promoting material between the carrier film and the basecoat layer, but it is preferably a mixture of an acrylic polymer and a polyurethane. The tiecoat should be from about 0.01 mil to 1.0 mil and preferably 0.01 mil to 0.5 mil in thickness. The tiecoat may also include an aminoplast in the amount of from 1 to 35 percent by weight and/or an alkylbenzene in the amount of 1 to 35 percent by weight of the tiecoat based, in both cases, on weight of resin solids.

The acrylic polymers are copolymers of one or more alkyl esters of acrylic acid or methacrylic acid optionally together with one or more other polymerizable ethylenically unsaturated monomers. These polymers may be either of the thermoplastic type or thermosetting crosslinking type. Suitable alkyl esters of acrylic acid or methacrylic acid include methyl methacrylate, ethyl methacrylate, butyl methacrylate, ethyl acrylate, butyl acrylate and 2-ethylhexyl acrylate. Suitable other copolymerizable ethylenically unsaturated monomers include vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate.

Where the polymer is of the crosslinking type, suitable functional monomers may be used in addition to the other acrylic monomers mentioned above and include, for example, acrylic acid, methacrylic acid, hydroxyethyl acrylate, hydroxyethyl methacrylate, hydroxypropyl acrylate, and hydroxypropyl methacrylate. The coating composition in such cases contains a crosslinking agent such as an aminoplast such as those described below, particularly a condensate of melamine and an aldehyde such as formaldehyde or a lower alkyl ether of such condensate in which the alkyl groups contain from 1 to 4 carbon atoms. Other crosslinking agents such as polyisocyanates including blocked polyisocyanates may also be used. Also, the acrylic polymer can be prepared with N-(alkoxymethyl)acrylamides and N-(alkoxymethyl)methacrylamides which result in self-crosslinking acrylic polymers. Aminoplasts are preferred curing agents and are present in amounts of from about 1 to 35 percent by weight based on weight of resin solids in the tiecoat.

The acrylic polymer may be prepared by solution polymerization techniques in the presence of suitable catalysts such as organic peroxides or azo compounds, for example, benzoyl peroxide or N,N'-azobis-(isobutyronitrile). The polymerization can be carried out in an organic solution in which the monomers are soluble. Suitable solvents are aromatic solvents such as xylene and toluene and ketones such as methyl amyl ketone. Alternately, the acrylic polymer may be prepared by aqueous emulsion or dispersion polymerization techniques.

The polyurethane polymer useful in forming this tiecoat would be prepared in the manner described above in connection with the paint layer. The acrylic and the polyurethane would be blended in a proportion of 90:10 to 10:90 by weight based on the weight of resin solids.

Figure 3:
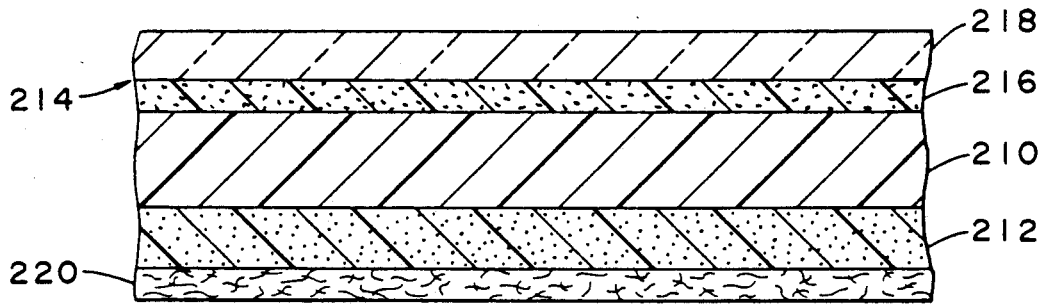
Figure 4:
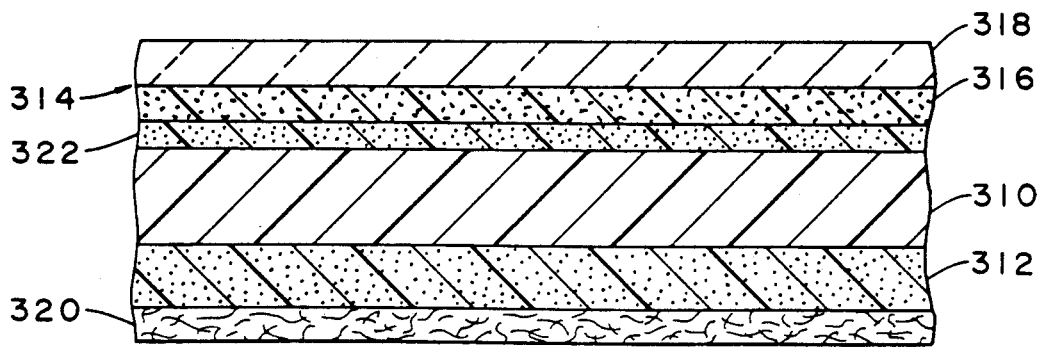

FIGS. 3 and 4 have the same elements as those which are included in FIGS. 1 and 2. The paint composite article of FIG. 3 includes a carrier film 210, having an adhesive layer 212 on its one side and a paint layer 214 made up of a pigmented layer 216 and a transparent topcoat layer 218 on its other side. It may also optionally include a temporary protective cover 220. The paint composite article of FIG. 4 includes a carrier film 310 with an adhesive layer on one side and a tiecoat layer 322 and a paint layer 314 on its other side. The paint layer would consist of a pigmented basecoat layer 316 and a transparent topcoat layer 318. It would also optionally include a temporary protective cover 320. These elements would be the same as the corresponding elements described above in connection with FIGS. 1 and 2 except that the pigmented basecoat 216 or 316 would include an aminoplast in an amount sufficient to enhance the adhesion of the basecoat to the thermally deformable carrier film but preferably in an amount insufficient to crosslink the thermoplastic film-forming binder.

Aminoplast resins are aldehyde condensation products of melamine, urea, and similar compounds; products obtained from the reaction of formaldehyde with melamine, urea or benzoguanamine are most common and are preferred herein. However, condensation products of other amines and amides can also be employed, for example, aldehyde condensates of triazines, diazines, triazoles, guanidines, guanamines and alkyl and aryl substituted derivatives of such compounds, including alkyl and aryl substituted ureas and alkyl and aryl substituted melamines. Some examples of such compounds are N,N'-dimethylurea, benzourea, dicyandiamide, formoguanamine, acetoguanamine, ammeline, 2-chloro-4,6-diamino-1,3,5-triazine, 6-methyl-2,4-diamino-1,3,5-triazine, 3,5-diaminotriazole, triaminopyrimidine, 2-mercapto-4,6-diaminopyrimidine, 2,4,6-trimethyl triamino-1,3,5-triazine, and the like.

While the aldehyde employed is most often formaldehyde, other similar condensation products can be made from other aldehydes, such as acetaldehyde, crotonaldehyde acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohol such as cyclohexanol, monoethers of glycols such as ethylene glycol and diethylene glycol, and halogen-substituted or other substituted alcohols, such as 3-chloropropanol. The preferred amine-aldehyde resins are etherified with methanol or butanol.

Preferably, the aminoplasts which are used are melamine-, urea-, or benzoguanamine-formaldehyde condensates etherified with an alcohol containing from about 1 to 4 carbon atoms or mixtures thereof. When used in the basecoat compositions, the aminoplast is generally present in amounts of about 1 to 35, usually 5 to 15 percent by weight, based on weight of resin solids.

The invention is illustrated but is not limited by the following examples. In these examples and throughout the specification, parts and percentages are by weight unless otherwise specified.

Example A

A water-diluted polyurethane binder was prepared from the following ingredients:

| Ingredients | Parts by Weight (pounds) |
|---|---|
| N-methyl-2-pyrrolidone | 432.4 |
| FORMREZ 55-56[1] | 315.0 |
| POLYEG 2000[2] | 315.0 |
| Dimethylolpropionic acid | 129.0 |
| DESMODUR W[3] | 573.0 |
| Neopentyl glycol | 6.5 |
| Deionized water | 2348.0 |
| Dimethylethanolamine | 82.3 |
| Ethylenediamine | 43.7 |

[1]Poly(neopentyl adipate) glycol having a molecular weight of 2000, available from Witco Company.
[2]Polytetramethylene glycol having a molecular weight of 2000, available from Quaker Oats Company.
[3]4,4'-methylene-bis(cyclohexyl isocyanate) available from Mobay Corporation.

The N-methyl-2-pyrrolidone, FORMREZ 55-56, POLYMEG 2000, dimethylolpropionic acid and 257 grams (g) of dibutyltin dilaurate and 2858 g of n-butanol were charged to a clean dry reactor set for total reflux, heated to 185° F. to 194° F. (85° C. to 90° C.) under a nitrogen blanket, and held for about 15 minutes until reaction mixture is homogeneous. The reaction mixture was then cooled to 130° F. to 140° F. (54° C. to 60° C.) and the DESMODUR W added, followed by the addition of the neopentyl glycol. The temperature of the reaction mixture was adjusted to 158° F. to 167° F. (70° C. to 75° C.) and held for about 15 minutes until the batch became homogeneous. The temperature of the reaction mixture was adjusted to 185° F. to 194° F. (85° C. to 90° C.) and dispersed by adding to a mixture of the deionized water, dimethylethanolamine and ethylenediamine while maintaining temperature of the dispersion between 158° F. to 167° F. (70° C. to 75° C.). The resulting dispersion was stirred for 30 minutes at 158° F. to 167° F. (70° to 75° C) and cooled to 86° F. to 95° F. (30° C. to 35° C.). The dispersion had a solids content of 34.3 percent and a pH of 7.86.

Example B

An iminated water-diluted polyurethane binder was prepared from the following:

| Ingredients | Parts by Weight |
|---|---|
| Polyurethane dispersion of Example A | 522.8 |
| Hydroxyethyl ethyleneimine | 2.2 |
| Deionized water | 5.0 |

The polyurethane dispersion was charged to a reaction vessel, the hydroxyethyl ethyleneimine slowly added over over several minutes and the mixture heated at about 70° C. for one hour. The mixture was then diluted with the deionized water. The resulting dispersion had a solids content of 33.2 percent and a pH of 8.8.

Example C

An acrylic resin was prepared from the following:

| Ingredients | Parts by Weight |
|---|---|
| Initial Charge | |
| Deionized water | 16.8 |
| Feed A (described below) | 342.5 |
| Butyl CARBITOL (monobutyl ether of diethylene glycol) | 45.1 |
| t-Butyl peracetate | 4.5 |
| Feed A | |
| Styrene | 268.4 |
| Butyl acrylate | 259.6 |
| Butyl methacrylate | 165.7 |
| Methyl methacrylate | 40.2 |
| Acrylic acid | 75.2 |
| Hydroxypropyl acrylate | 84.6 |
| Feed B | |
| Butyl CARBITOL | 112.5 |
| Feed C | |
| Butyl CARBITOL | 105.4 |
| t-Butyl peracetate | 10.6 |
| Feed D | |
| Butyl CARBITOL | 22.5 |
| Deionized water | 16.8 |
| Feed E | |
| Butyl CARBITOL | 29.7 |
| t-butyl perbenzoate | 0.9 |
| Feed F | |
| Butyl CARBITOL | 15.8 |
| Feed G | |
| Dimethylethanolamine | 49.5 |
| Feed H | |
| Deionized water | 2025.0 |

The initial charge was heated to reflux (about 97° C.) in a properly equipped reaction vessel. The remainder of Feed A and Feed C were then added over a three-hour period with continued refluxing. Feeds B and D were added after completion of the Feeds A and C addition, followed by addition of Feed E over about an hour and subsequent addition of Feed F. The resultant mixture was refluxed for an additional hour, followed by addition of Feed G and subsequent addition of Feed H over a quarter hour. The final mixture was cooled and analysis indicated a solids content at 150° C. for one hour of 24.2 percent, a pH of 7.8 and a number average molecular weight of about 20,300 as measured by gel permeation chromatography with a polystyrene standard.

Example D

In a 22 liter round bottom 4-neck flask equipped with a metal stirrer, nitrogen gas inlet tube, thermometer and steam condenser with saddlepacked take off head, the following ingredients were charged:

| Ingredients | Parts by Weight (grams) |
| --- | --- |
| Trimethylolpropane | 900 |
| Neopentyl glycol | 5391 |
| Adipic acid | 1026 |
| Tetrahydrophthalic anhydride | 6420 |
| Dibutyltin dilaurate (catalyst) | 28.2 |

The entire mixture was heated to 168° C. (head temperature 99° C.). At this point 150 ml of distillate had been collected, most of which was water. After 6 hours the temperature had reached 221° C. (head temperature 90° C.). 920 ml of distillate had been collected and the acid value was 25. After an additional 2 hours the acid value had reached 18.5 and the batch was cooled overnight. Heating was resumed the next day, and in 3 hours the temperature had reached 222° C. at which time 976 ml of distillate had been collected, and the acid value at that point was 13.6. The reaction was continued another 1.5 hours at 122° C. and a total distillate of 1,009 ml was collected by that time. The acid value at that point was 9.13 and the resin viscosity, thinned to 70 percent by weight in methyl isobutyl ketone, was J on the Gardner scale. At this point the batch was cooled to 122° C. and a vacuum of 20 mm/Hg was applied for a period of 20 minutes. At a temperature of 114° C. a mixture of 512 g of 85 percent phosphoric acid and 488.8 g of a 70 percent/30 percent mixture by weight of xylene and methyl isobutyl ketone was added to the reaction mixture. The equipment was then modified by replacing the steam condenser with a Dean-Stark trap with a cold water condenser. The reaction mixture was heated to 151° C. at which point 16 ml of distillate was collected and the acid value was 45. Over the next 2.5 hours, the temperature was increased to 184° C. with 160 ml of distillate being collected and the acid value being 30.6. Heating was continued for an additional hour at which point the temperature was 190° C. with 180 ml of distillate being collected and the acid value being 27.5. A vacuum of 20 mm/Hg was applied to the reaction mixture for 27 minutes. The reaction mixture was cooled to 140° C. and thinned with butyl CARBITOL to approximately 60 percent solids. The final product had a measured solids content of 60.5 percent by weight, an acid value of 18.9, a viscosity of 16.7 poise and a hydroxyl number of 150.

Basecoats

Example E

A silver metallic basecoat composition including a water dilutable polyurethane was prepared from the following:

| Ingredients | Parts by Weight |
| --- | --- |
| Monohexylether of ethylene glycol | 95.4 |
| Butyl CARBITOL | 30.3 |
| Isopropanol | 13.0 |
| Silicone surfactant[1] | 17.3 |
| Titanate solution[2] | 8.67 |
| Phosphatized polyester from Example D | 27.7 |
| U.V. absorber[3] | 13.0 |
| Aluminum pigment[4] | 147.0 |
| Polyurethane dispersion of Example B | 1250 |
| Deionized water | 217.0 |
| Toluene | 101.88 |

[1] A 25 percent by weight solution of L5310 silicone in monohexylether of ethylene glycol.
[2] A 0.76 percent by weight solution of di(dioctyl)phosphatoethylene titanate (a liquid material available from Kenrich Company) in monohexylether of ethylene glycol neutralized with dimethylethanolamine to a pH of 7.5.
[3] A liquid U.V. absorber of the hydroxyphenylbenzotriazole class, available from Ciba-Geigy Corporation as TINUVIN 1130.
[4] Non-acid resistant pigment available as PA-8260 from J. H. Hinz.

A vessel was charged with the butyl CARBITOL, monohexylether of ethylene glycol, isopropanol, silicone surfactant, titanate solution, phosphatized polyester and U.V. absorber. The aluminum pigment was then mixed with agitation until completion dispersed. Deionized water and 217 parts of the polyurethane dispersion were premixed and then added to the vessel with agitation. The remainder of the polyurethane dispersion was added to complete the admixture.

Example F

A black pigment paste was prepared from the following:

| Ingredients | Parts by Weight |
| --- | --- |
| Butyl CARBITOL | 8.32 |
| Deionized water | 39.00 |
| SURFYNOL Tg[1] | 0.62 |
| TAMAL 731[2] | 1.38 |
| Dimethylethanolamine | 0.84 |
| Polyurethane dispersion of Example B | 35.30 |
| Carbon black | 4.32 |

[1] A pigment dispersing aid, available from Air Products and Chemicals, Inc.
[2] A pigment dispersing aid, available from Rohm and Haas Co.

The above ingredients were ground in a steel ball attritor to a Hegman 8 grind, followed by addition of 14.2 parts of deionized water.

Example G

A blue pigment was prepared from the following:

| Ingredients | Parts by Weight |
| --- | --- |
| Butyl CARBITOL | 3.20 |
| Deionized water | 5.82 |
| SURFYNOL Tg[1] | 0.20 |
| TAMAL 731[2] | 0.60 |
| Polyurethane dispersion of Example B | 21.18 |
| Blue pigment[3] | 4.00 |

[1] As in Example F.
[2] As in Example F.
[3] Available as Palamar Blue from Harmon Color Corporation.

The above ingredients were ground in a steel ball attritor to a Hegman 7.5 grind, followed by addition of 5.0 parts deionized water.

Example H

A basecoat composition including a water dilutable polyurethane was prepared from the following:

| Ingredients | Parts by Weight |
|---|---|
| Charge 1 | |
| Black pigment paste from Example F | 240.0 |
| Blue pigment paste from Example G | 9.06 |
| Silicone surfactant solution[1] | 9.96 |
| Metal coated mica[2] | 2.29 |
| Monohexylether of ethylene glycol | 3.43 |
| Charge 2 | |
| Polyurethane dispersion of Example B | 6.87 |
| Deionized water | 8.92 |
| Charge 3 | |
| Polyurethane dispersion of Example B | 625.0 |
| U.V. light absorber[3] | 7.47 |
| Isopropanol | 7.47 |
| Charge 4 | |
| Monohexylether of ethylene glycol | 49.8 |
| Charge 5 | |
| Polyurethane dispersion of Example B | 15.3 |
| Deionized water | 30.6 |
| Silica[4] | 5.11 |

[1]As in Example E.
[2]Available as 139X Bright Mica from PI-CON.
[3]As in Example E.
[4]Available from PPG Industries, Inc. as LOVEL 27.

The basecoat composition was prepared from the above charges by sequentially premixing each charge and then adding each charge to a vessel.

Clear Coat

Example I

A polyester-urethane polyol was prepared from reacting isophorone diisocyanate with a polyester diol prepared from dimerized fatty acids. The polyester was prepared from the following ingredients:

| Ingredients | Parts by Weight |
|---|---|
| EMPOL 1010[1] | 1276.0 |
| Cyclohexane dimethanol | 378.0 |
| Trimethylolpropane | 139.0 |
| Neopentyl glycol | 359.0 |
| Butyl stannoic acid | 0.93 |
| Triphenyl phosphine | 1.07 |
| Xylene | 107.0 |
| Deionized water | 200.0 |

[1]Dimerized fatty acid available from Emery Chemical Company.

The ingredients were charged to a reaction vessel equipped for reflux and a nitrogen sparge. The admixture was heated under nitrogen to reflux and then maintained at reflux until an acid value of about one was obtained. The resultant product had a solids content of about 95 percent, an acid value of about 0.54 and a hydroxyl value of about 2.85.

The above prepared polyester was subsequently reacted with a diisocyanate as follows:

| Ingredients | Parts by Weight |
|---|---|
| Polyester from above | 5103.6 |
| Neopentyl glycol | 1614.0 |
| Isophorone diisocyanate | 4414.0 |
| Dibutyltin dilaurate | 1.1 |
| Toluene | 6022.6 |

The polyester, neopentyl glycol, toluene and dibutyltin laurate were charged to a reaction vessel equipped for reflux and a nitrogen sparge. The admixture was heated to 80° C. under nitrogen and the isophorone diisocyanate was added over about an hour, and an exothermic reaction ensued. After the exotherm began to subside, the reaction temperature was maintained at about 80° C. until an IR spectrum initiated the disappearance of isocyanate groups. The resultant product had a solids content at 110° C. of 64.3 percent, an acid value of 0.2, a hydroxyl value of 51.9 and a number average molecular weight of about 2100.

Example J

A two-package clear coat composition including a polyurethane polyol in one package and a polyisocyanate in a second package was prepared from the following:

| Package a | |
|---|---|
| Ingredients | Parts by Weight |
| Polyurethane polyol of Example I | 3280.3 |
| Dibutyltin dilaurate | 8.4 |
| U.V. absorber[1] | 80.5 |
| U.V. stabilizer[2] | 13.3 |
| Surfactant[3] | 4.2 |
| Acetyl acetone | 24.7 |
| Toluene | 202 |

[1]As in Example E.
[2]A 50 percent by weight solution of a hindered amine light stabilizer, available as TINUVIN 292.
[3]Available as SF-1023 silicone from General Electric Company.

The above ingredients were charged with good agitation and in the order listed to a container to form the first package.

Package b

The second package (587.9 parts by weight) is a polyfunctional aliphatic isocyanurate resin based on hexamethylene diisocyanate, available as DESMODUR N-3300 from Mobay Corporation.

Adhesives

Example K

An adhesive was made from an acrylic latex, a defoamer which is commercially available as HODAG ANTIFOAM PX 13, a fungicide which is commercially available as AMOCO FLOWABLE ABG 8001 and a polyacrylate thickener which is commercially available from the Union Chemicals Division of Union Oil Company as AUSCO RES 6038. The acrylic latex had a solids content of 55 percent solids in water, a viscosity of 25 centipoises and a pH of 7.1 and was made from the following ingredients:

| Ingredients | Parts By Weight |
|---|---|
| Isobutyl acrylate | 59.4 |
| Butyl acrylate | 30.7 |
| Methyl methacrylate | 6.9 |
| Styrene | 1 |
| Hydroxypropyl acrylate | 1 |
| Acrylic acid | 1 |

Example L

Another adhesive was made from the following ingredients:

| Ingredients | Parts by Weight |
|---|---|
| Initial Charge | |
| Deionized water | 742.1 |
| Sodium bicarbonate | 8.4 |

-continued

| Ingredients | Parts by Weight |
|---|---|
| Feed A | |
| Deionized water | 740.7 |
| Potassium persulfate | 29.4 |
| Feed A-1 | |
| Deionized water | 70.8 |
| Feed B | |
| Isobutyl acrylate | 3037.8 |
| Butyl acrylate | 1569.6 |
| Methyl methacrylate | 302.4 |
| Acrylic acid | 50.4 |
| Styrene | 50.4 |
| Hydroxypropyl acrylate | 52.2 |
| Phosphate ester surfactant[1] | 25.3 |
| Feed B-1 | |
| Feed B | 70.8 |
| Feed C | |
| Deionized water | 70.8 |
| Feed D | |
| Deionized water | 221.0 |

[1]EMPHOS CS-136 available from Witco Chemical Co.

The initial charge was heated to 85° C. then Feed A was added over 10 minutes at the same temperature. Feed A-1 was then used to rinse Feed A. Feed B was then added and the mixture was held for 15 minutes at reaction temperature. Feed B-1 was added over 5 hours and then the mixture was held at the same temperature for 2 hours. Feeds C and D were added and the reaction mixture was cooled. Experimental solids were 60 percent, pH was 2.8, viscosity was 25 centipoises and particle size was 35 angstroms.

Tiecoats

Example M

An adhesion promoter was prepared from the following:

| Ingredients | Parts by Weight |
|---|---|
| Polyurethane dispersion of Example B | 822.1 |
| Acrylic resin from Example C | 1118.0 |
| Silicone surfactant[1] | 5.6 |
| Deionized water | 1621.0 |

[1]A silicone surfactant available as L5310 from Union Carbide Corporation.

The polyurethane dispersion and acrylic resin were entered into a vessel. The silicone surfactant was added to the previous admixture with agitation. Deionized water was then slowly added with continued agitation. The resultant product had a solids content of 15.7 percent.

Example N

Additional adhesion promoters were prepared in a similar fashion to Example M with the following:

| Ingredients | Parts by Weight | | |
|---|---|---|---|
| | 1 | 2 | 3 |
| Polyurethane dispersion of Example B | 4500.5 | 822.1 | 690.6 |
| Acrylic resin of Example C | 4500.5 | 822.1 | 1174.0 |
| Silicone surfactant[1] | 122.1 | 5.6 | 4.8 |
| Deionized water | 8876.1 | 1396.8 | 1116.0 |
| Aminoplast resin[2] | — | 63.6 | 53.4 |
| Toluene | — | 112.1 | — |

[1]A silicone surfactant available as L5310 from Union Carbide Corporation.
[2]A partially methylated melamine-formaldehyde resin available as RESIMENE 717 from Monsanto Company.

Example O

An acrylic latex composition was prepared from the following:

| Ingredients | Parts by Weight (pounds) |
|---|---|
| Feed 1 | |
| Deionized water | 300 |
| Feed 2 | |
| Styrene | 4620 |
| N-butyl acrylate | 2920 |
| N-butyl methacrylate | 2860 |
| Methyl methacrylate | 2600 |
| Hydroxypropyl acrylate | 1520 |
| Glacial acrylic acid | 1262 |
| Diethylene glycol monobutyl ether | 2528 |
| tert-dodecyl mercaptan | 78 |
| VAZO 64 catalyst | 134 |
| Feed 3 | |
| Deionized water | 266 |
| Sulfonic acid functional acrylic monomer[1] | 78 |
| Dimethylethanolamine | 30 |
| Feed 4 | |
| Diethylene glycol monobutyl ether | 199 |
| Feed 5 | |
| Deionized water | 83 |
| Feed 6 | |
| Diethylene glycol monobutyl ether | 254 |
| tert-butyl perbenzoate | 15.6 |
| Feed 7 | |
| Diethylene glycol monobutyl ether | 40 |
| tert-butyl perbenzoate | 8.4 |
| Feed 8 | |
| Diethylene glycol monobutyl ether | 32 |
| Feed 9 | |
| Dimethylethanolamine | 600 |
| Diethylene glycol monobutyl ether | 159 |
| Feed 10 | |
| Deionized water | 24240 |
| Dimethylethanolamine | 100 |
| Feed 11 | |
| Deionized water | 833 |

[1]Available under the trademark AMPS from Lubrizol Corporation.

In a reactor set for total reflux, Feed 1 and 5960 parts of Feed 2 were added. A nitrogen atmosphere was used and the mixture was heated to reflux and that heat was maintained. The remainder of Feed 2 and all of Feed 3 were then added to the reactor over a three hour period. Feeds 4 and 5 which were used, respectively, as tank rinses for the tanks containing Feeds 2 and 3 were also added. Feed 6 was then added over a two-hour period along with Feed 8 which was used as a tank rinse for the tank that contained Feed 6. The mixture was held at reflux for two hours after which it was cooled to 215° F. Feed 9 was then added after which the mixture was cooled to 210° F. and held for 40 minutes. Feed 11 which was a tank rinse for the Feed 10 tank was also added. Feeds 10 and 11 had been heated to 175° F. before being added.

Examples P-Q

Tiecoat compositions were made with the following ingredients:

| Ingredients | Parts by Weight | |
|---|---|---|
| | Example P | Example Q |
| Polyurethane dispersion of Example B | 140.6 | 140.6 |
| Acrylic latex of Example O | 132.3 | 132.3 |
| Aminoplast resin[1] | 11.9 | — |

| Ingredients | Parts by Weight | |
|---|---|---|
| | Example P | Example Q |
| Silicone surfactant[2] | 4.0 | 4.0 |
| Toluene | 10.0 | — |
| Deionized water | 295.3 | 295.3 |

[1]A partially methylolated melamine-formaldehye resin available as RESIMENE 717 from Monsanto Company.
[2]A silicone surfactant available as L5310 from Union Carbide Corporation.

The polyurethane dispersion and acrylic resin of 1 and 2 were weighed into a reaction vessel. The aminoplast resin, silicone surfactant and toluene were added with agitation. Deionized water was then added with continued agitation. Solids of Example P were 17.0 percent and Example Q were 15.7 percent.

Basecoat With and Without Aminoplasts

Example R

A titanium dioxide pigment paste was prepared from the following ingredients:

| Ingredients | Parts by Weight |
|---|---|
| Butyl CARBITOL[1] | 52.19 |
| Hexyl CELLOSOLVE[2] | 52.19 |
| Deionized water | 550.54 |
| Urethane resin from Example B | 354.78 |
| TiO$_2$ pigment[3] | 499.2 |

[1]Available from Union Carbide Corporation.
[2]Monohexyl ether of ethylene glycol available from Union Carbide Corporation.
[3]Available as R902 from E. I. du Pont de Nemours and Co.

After the solvents were premixed, the resins were added. The TiO$_2$ pigment was then added and dispersed to a Hegman reading of 7.5.

Example S

A white, aqueous-based, polyurethane basecoat was prepared from the following ingredients:

| Ingredients | Parts by Weight |
|---|---|
| Paste from Example R | 602.3 |
| Polyurethane dispersion of Example B | 380.2 |
| Toluene | 19.6 |
| U.V. absorber[1] | 6.0 |
| Silicone surfactant[2] | 7.0 |
| Aminoplast resin[3] | 23.3 |

[1]A liquid U.V. absorber of the hydroxyphenylbenzotriazole class, available from Ciba-Geigy Corporation as TINUVIN 1130.
[2]Silicone surfactant available as L5310 from Union Carbide Corporation.
[3]A methylolated melamine available as RESIMENE 717 from Monsanto Corporation.

The toluene, U.V. absorber, silicone surfactant and aminoplast resin were premixed. The paste and polyurethane dispersion were charged to a vessel and mixed after which the premixed materials were added and mixed.

Example T

Another white, aqueous-based, polyurethane basecoat was prepared from the following ingredients:

| Ingredients | Parts by Weight |
|---|---|
| Paste from Example R | 928.0 |
| Silicone surfactant[1] | 2.95 |
| Polyurethane dispersion of Example A | 583.1 |
| U.V. absorber[2] | 7.4 |
| Aminoplast resin[3] | 39.3 |
| Toluene | 33.0 |
| Hexyl CELLOSOLVE | 8.85 |

[1]TINUVIN 1130.
[2]L5310.
[3]RESIMENE 717.

The ingredients, except for the paste and the polyurethane dispersion, were premixed. The paste and polyurethane dispersion were then mixed and the premixed ingredients were added.

Comparative Example U

Another white, aqueous-based, polyurethane basecoat was prepared in a manner like Example T except that no aminoplast resin was used.

Paint Composites

Example 1

To a thermoplastic polyester film available as PMB 10231 from Eastman Kodak Company having a thickness of about 7 mils a silver metallic basecoat composition is applied by roll coating at a thickness of 1.5 mils. The basecoat is cured at 180° F. for 10 minutes. Metallic orientation was observed as shown by evaluating the flop. Two successive clearcoat layers, each 1.25 mils in thickness of the material described in Example J, are spray applied and cured at 200° F. for 10 minutes. The adhesive from Example K is then applied at a thickness of about 3 mils to the polyester film on the side opposite the paint layer.

Example 2

A thermoplastic polyester film available as PMB 10231 from Eastman Kodak Company having a thickness of about 7 mils and containing a 3 mil layer of adhesive of Example L applied to one surface was coated on the opposed surface with the tiecoat of Example N to an average thickness of 0.02 mil by drawing down with a wire wound draw bar and dried at 180° F. for 10 minutes. The silver metallic basecoat composition of Example E was then applied over the adhesion promoter by drawing down with a 6 inch Universal draw bar. The basecoat, 1.5 mils in thickness, was cured by heating at 180° F. for 10 minutes. Excellent metallic orientation was observed as shown by evaluating the flop. Successive clearcoat layers, each 1.25 mils in thickness of the material described in Example J, were applied by drawing down with a 6 inch Universal draw bar and the coating cured at 180° F. for 10 minutes. The resultant free film was tested for solvent resistance by soaking the film under a watch glass with monohexyl ethyl of ethylene glycol and with toluene for a given time, followed by placing the film in a humidity cabinet at 100° F. and 100 percent relative humidity for 10 days. The results of the testing indicated an excellent overall solvent resistance by the film.

Example 3

The thermoplastic polyester film precoated with adhesive as described in Example 2 was coated on the side opposite the adhesive with the tiecoat of Example P by drawing down with a wire wound draw bar over about one-half of its surface to an average thickness of 0.33 mil and dried for 10 minutes at 180° F. The white basecoat of Example S was then applied at a thickness of 3.1 mils by drawing down with a 6 inch Universal draw bar and cured by heating at 180° F. for 10 minutes. One clearcoat layer having a thickness of 2.5 mils of the material described in Example J was applied by drawing down with a 6 inch Universal draw bar and cured at 180° F. for 10 minutes.

Example 4

A paint composite was made in the same way as is described in Example 3 except the tiecoat composition from Example Q was used instead of the composition from Example P.

Test 1

The paint composites made in Examples 3 and 4 were tested for adhesion by manually attempting to peel the paint layer (combined basecoat and clearcoat layers) from the thermoplastic film. In the case of both composites, the paint layers were easily pulled from the film over those portions of the composite in which no tiecoat was used between the thermoplastic film and the paint layer. Over the portion of both composites where a tiecoat was applied between the paint layer and the thermoplastic film, the paint layer was separated from the film only with difficulty.

Example 5

The thermoplastic polyester film precoated with adhesive as described in Example 2 was coated on the side opposite the adhesive with the tiecoat of Example P as generally described in Example 2. The white basecoat from Example T was then applied over the adhesion promoter by drawing down with a 6 inch Universal draw bar at a thickness of 1.5 mils. The basecoat is cured at 180° F. for 10 minutes. A clearcoat layer of 2.5 mils in thickness of the material described in Example J was applied as described in Example 3 and cured at 180° F. for 10 minutes.

Comparative Example 6

A paint composite was made in the same way as Example 5 except that the white basecoat was from Example U.

Test 2

The paint composites from Example 5 and Comparative Example 6 were both vacuum formed over a steel panel. These panels were scribed from top to bottom and placed into a salt spray chamber for 14 days after which the creepage from the scribe line was evaluated. The panel having the paint composite from Example 5 showed no creepage indicating excellent adhesion of the paint composite to the substrate. The panel having the paint composite from Example 6 exhibited creepage, i.e., the paint layer shrunk back from the carrier film adjacent the scribe line.

What is claimed is:

1. A paint composite article comprising:
   (a) a thermally deformable carrier film having first and second major surfaces,
   (b) an adhesive superimposed on the first surface of the thermally deformable carrier film,
   (c) an adhesion promoting tiecoat layer comprising a mixture of an acrylic polymer and a polyurethane superimposed on the second surface of the carrier film,
   (d) a paint layer superimposed on said tiecoat layer, said paint layer comprising (i) a pigmented basecoat adhered to the thermally deformable carrier film through said tiecoat layer; and (ii) a transparent topcoat layer superimposed on the basecoat layer.

2. The article of claim 1 wherein the relative amount of acrylic polymer and polyurethane is in a proportion of from about 90 to 10 to about 10 to 90 based on the weight of resin solids in the tiecoat.

3. The article of claim 1 wherein the tiecoat layer contains an aminoplast.

4. The article of claim 3 wherein the aminoplast is present in an amount of from about 1 percent to about 35 percent by weight based on the weight of resin solids in the tiecoat.

5. The article of claim 3 wherein the aminoplast is a condensate of melamine and an aldehyde.

6. The article of claim 5 wherein the tiecoat layer contains a partially methylolated melamine-formaldehyde resin.

7. The article of claim 3 wherein the tiecoat layer includes an alkylbenzene.

8. The article of claim 7 wherein the alkylbenzene is present in an amount of from about 1 percent to about 35 percent by weight based on the weight of resin solids in the tiecoat.

9. The article of claim 7 wherein the alkylbenzene is toluene.

10. The article of claim 1 wherein the pigmented basecoat is derived from a thermoplastic polyurethane film-forming binder.

11. The article of claim 1 wherein the transparent topcoat is derived from a polyurethane polyol and a polyisocyanate curing agent.

12. The article of claim 10 wherein the basecoat layer has an elongation from about 150 percent to about 300 percent.

13. The article of claim 10 wherein the polyurethane is a polyester urethane.

14. The article of claim 1 wherein the adhesive is an acrylic latex polymer prepared from aliphatic acrylate monomers having pendant carbon chains of from about 3 to about 5 carbon atoms.

15. The article of claim 11 wherein the polyurethane polyol is a polyester urethane polyol.

16. The article of claim 1 wherein a temporary protective cover is superimposed over the adhesive layer.

17. The article of claim 16 wherein the temporary protective cover consists of a material selected from paper and a polymeric material.

18. The article of claim 1 wherein the transparent clearcoat layer has an elongation of from about 150 percent to about 300 percent.

19. The article of claim 1 wherein the basecoat layer includes a metallic pigment applied with sufficient shear force to produce metallic orientation.

20. The article of claim 19 wherein the metallic pigment is selected from the group consisting of aluminum flake, copper bronze flake and metal oxide coated mica.

* * * * *